United States Patent
Wang (10) Patent No.: US 6,222,444 B1
(45) Date of Patent: Apr. 24, 2001

(54) METHOD FOR DETECTING A DEFLATED TIRE ON A VEHICLE

(75) Inventor: Orson Szu-Han Wang, Ann Arbor, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/542,488

(22) Filed: Apr. 3, 2000

(51) Int. Cl.[7] .................................................. B60C 23/00
(52) U.S. Cl. ........................ 340/442; 340/443; 340/444; 340/466
(58) Field of Search ................................... 340/442, 443, 340/444, 441, 466

(56) References Cited

U.S. PATENT DOCUMENTS

| | | | |
|---|---|---|---|
| 4,876,528 | 10/1989 | Walker et al. | 340/442 |
| 5,192,929 | 3/1993 | Walker et al. | 340/444 |
| 5,239,469 | 8/1993 | Walker et al. | 701/29 |
| 5,248,957 | 9/1993 | Walker et al. | 340/444 |
| 5,252,946 | 10/1993 | Walker et al. | 340/444 |
| 5,345,217 * | 9/1994 | Prottey | 340/442 |
| 5,442,331 | 8/1995 | Kishimoto et al. | 340/444 |
| 5,483,220 | 1/1996 | Kushimoto et al. | 340/444 |
| 5,524,482 | 6/1996 | Kushimoto et al. | 340/444 |
| 5,541,573 | 7/1996 | Jones | 340/442 |
| 5,552,760 | 9/1996 | Jones | 340/442 |
| 5,578,984 | 11/1996 | Nakajima | 340/444 |
| 5,589,815 * | 12/1996 | Nishihara et al. | 340/444 |
| 5,589,816 | 12/1996 | Jones | 399/286 |
| 5,591,906 | 1/1997 | Okawa et al. | 73/146.5 |
| 5,604,307 | 2/1997 | Iida et al. | 73/146.2 |
| 5,619,111 | 4/1997 | Katagiri et al. | 318/625 |
| 5,629,478 | 5/1997 | Nakajima et al. | 73/146.2 |
| 5,691,694 | 11/1997 | Horie | 340/444 |
| 5,710,539 | 1/1998 | Iida | 340/444 |
| 5,721,374 * | 2/1998 | Siekkinen et al. | 73/146.2 |
| 5,721,528 * | 2/1998 | Boesch et al. | 340/442 |
| 5,724,266 | 3/1998 | Kishimoto et al. | 702/141 |
| 5,734,319 | 3/1998 | Stephens et al. | 340/442 |

(List continued on next page.)

FOREIGN PATENT DOCUMENTS

| | | |
|---|---|---|
| 0 657 314 | 6/1995 | (EP) . |
| 0 786 362 | 7/1997 | (EP) . |
| 0 787 606 | 8/1997 | (EP) . |
| 0 826 968 | 3/1998 | (EP) . |
| 0 832 767 | 4/1998 | (EP) . |
| 0 872 362 | 10/1998 | (EP) . |
| 0 872 363 | 10/1998 | (EP) . |

OTHER PUBLICATIONS

Hines and Montgomery; Probability and Statistics in Engineering and Management Science, pp. 312–313.

Hines and Montgomery; Probability and Statistics in Engineering and Management Science, pp. 584 and 708.

*Primary Examiner*—Jeffery Hofsass
*Assistant Examiner*—Son Tang
(74) *Attorney, Agent, or Firm*—Michael Best & Friedrich LLP (57) ABSTRACT

Wheel speed values for each of four wheels are collected and statistically analyzed axle by axle for a difference which could indicate low tire pressure. Prior to analysis, and following reset of the system, calibration factors are determined for each axle to compensate for rolling radius variation, and are subsequently used to correct the percentage difference values for the two wheels on any one axle. When a sufficient number of values have been collected, a $t_0$ value is calculated for each axle according the paired t-test statistical method or a slight variation thereof The $t_0$ value for each axle is then compared to a respective empirical value based on a predetermined pressure loss. This comparison can provide the basis for a driver warning. Various types of filters can be used prior to calculating the $t_0$ values to eliminate data that may lead to improper deflation detection.

20 Claims, 3 Drawing Sheets

U.S. PATENT DOCUMENTS

| | | | |
|---|---|---|---|
| 5,748,076 | 5/1998 | Horie | 340/442 |
| 5,760,682 * | 6/1998 | Liu et al. | 340/444 |
| 5,771,480 | 6/1998 | Yanase | 701/8 |
| 5,783,991 | 7/1998 | Jones | 340/444 |
| 5,826,207 | 10/1998 | Ohashi et al. | 701/36 |
| 5,828,975 | 10/1998 | Isshiki et al. | 701/72 |
| 5,838,230 | 11/1998 | Jones | 340/444 |
| 5,844,475 | 12/1998 | Horie | 340/442 |
| 5,866,812 * | 2/1999 | Nishihara et al. | 73/146.2 |
| 5,929,756 | 7/1999 | Randazzo et al. | 340/444 |

* cited by examiner

METHOD FOR DETECTING A DEFLATED TIRE ON A VEHICLE

FIELD OF THE INVENTION

The invention relates to a method of detecting when the air pressure in a tire has fallen below a predetermined pressure level, based on the measured wheel speeds.

BACKGROUND OF THE INVENTION

The advent of anti-lock brake systems (ABS) and the placement of speed sensing devices at each of the wheels has sparked efforts to develop reliable methods for detecting tire deflation based on wheel speeds measured during driving. Theoretically, four equally inflated tires on a vehicle will have substantially the same rolling radius and will therefore each rotate at substantially the same speed during straight-line driving on a dry, flat and uniform surface. When a tire becomes deflated, its rolling radius is reduced and the wheel speed increases to compensate for the smaller radius. Numerous methods have been created that monitor the wheel speeds and detect variations that may be attributable to tire deflation.

A recurring problem associated with these deflation detection methods involves the ability to filter or eliminate the collection of faulty data points caused by a variety of factors such as built-in tire radius variations, vehicle maneuvering, road conditions and drive slip. Without eliminating or filtering out these faulty readings, the detection methods are prone to improper warnings of tire deflation or failure to detect actual tire deflation. False warnings are troublesome and annoying to drivers, while failure to detect deflation is dangerous and could result in tire blow-outs. Methods that accurately detect tire deflation while avoiding false detection have become the utmost priority.

Filtering or eliminating faulty data caused by drive slip has been a significant obstacle. Simply stated, a vehicle's driven wheels slip due to the torque being applied to the axle. This slippage results in higher wheel speeds for the driven wheels than for the non-driven wheels. For example, on a rear wheel drive vehicle travelling at highway speeds, the rear wheels may rotate approximately one percent faster than the non-driven front wheels. This one percent variation is unacceptably high in light of the small wheel speed variations (typically 0.1 percent to 0.5 percent) caused by an actual deflated tire. If faulty data is not filtered or eliminated, drive slip error can wash out the influence of tire pressure and thus severely degrade the ability to detect tire deflation. Drive slip becomes even more problematic during acceleration, uphill/downhill driving and driving on non-uniform surfaces (such as dirt, sand or gravel).

Several attempts have been made to filter or eliminate the effect of drive slip on collected data. U.S. Pat. No. 5,760,682, issued Jun. 2, 1998, applies an analysis of the variance (ANOVA) statistical technique to the data collected from all four wheel speeds. The statistical method incorporated provides more accurate results than the more common average value comparison methods (where the data collected for each wheel is simply averaged before being used in a comparison algorithm) typically used. Filters are used to eliminate data collected during acceleration/deceleration, uphill/downhill driving, tuning/cornering fluctuation and rough road driving, but drive slip occurring during straight-line driving would tend to fool the analysis of variance technique since it is not able to distinguish the increase in wheel speed due to drive slip from the increase in wheel speed due to tire deflation. A false detection may occur.

U.S. Pat. No. 5,578,984, issued Nov. 26, 1996, discloses a system where drive slip is learned and compensated for with a correction factor designated as the front/rear wheel ratio Z. Such a learning process is not robust since data resulting from such learning only applies to the surface on which it was learned. For example, if such learning occurred on dry asphalt, the resulting correction factor will be wrong for data collected while driving on wet asphalt. Additionally, if such learning occurred on a level road surface, the resulting correction factor will be wrong for data collected while driving uphill since uphill driving requires more power at the drive wheels, causing more drive slip. False detection or failure to detect may result.

U.S. Pat. No. 4,876,528, issued Oct. 24, 1989, and U.S. Pat. No. 5,591,906, issued Jan. 7, 1997, disclose methods wherein angular velocities of two diagonally opposed wheels are added together and then compared (using various techniques) with the sum of the angular velocities of the other two diagonally opposed wheels. While this method should be resistant to drive slip error, there are other limitations associated with the formula, such as sensitivity to the diagonal component. For example, the front left wheel and rear right wheel could each only be slightly deflated (perhaps only ten percent), but the sum of that diagonal would appear the same as the case where only one of the wheels were significantly deflated (perhaps twenty-five percent). This results in undesired sensitivity since the objective is to detect twenty-five percent or greater deflation on one tire. Again, false detection may result.

Another problem with combining data from diagonally opposed wheels is discussed in U.S. Pat. No. 5,578,984. In many high performance sports cars, different sized tires are used for the front and rear axles. When this occurs, the critical threshold values used to detect deflation will be different for front and rear tires. Using diagonally opposed front and rear tires commingles the data so that the front and rear wheels can not be treated independently.

SUMMARY OF THE INVENTION

The present invention provides an improved method that substantially remedies the above-identified problems associated with attempts to eliminate error due to drive slip. Unlike the prior art methods that utilize data taken from all four tires in various combinations (i.e., comparing values from all four tires individually, opposing sets of diagonal tires or front tires and rear tires), the method of the present invention recognizes that utilizing combinations of data taken from all four tires cannot adequately prevent errors associated with drive slip.

As such, the present invention comprises a method for detecting a deflated tire wherein only the two wheels of one axle are considered at any one time to determine whether a tire is deflated. Since both wheels on a given axle rotate at substantially the same speed during straight-line driving, the comparison is inherently immune to drive slip and errors associated with using data from diagonally opposed tires. Even though the driven wheels tend to rotate faster than the non-driven wheels and may be larger than the non-driven wheels, the relative speed difference between the two driven wheels or the two non-driven wheels is zero. The present invention therefore analyzes the difference in speed between two wheels on a single axle to detect tire deflation. On the other hand, all four wheel speeds are still used together to detect rough road conditions and vehicle maneuvering conditions that provide other instances when false data should be filtered or eliminated. The result is a method of detecting a deflated tire that recognizes instances when data is faulty and should not be used, and additionally utilizes an algorithm that is inherently immune to drive slip error.

More specifically, the present invention is an improvement over U.S. Pat. No. 5,760,682, which is hereby incorporated by reference. In the present invention, a new statistical method suited for comparing data variability between two wheels replaces the ANOVA statistical analysis, which is suited for comparing data variability between all four wheels. The present invention utilizes a paired t-test statistical analysis, and more preferably a modification of the paired t-test, to consider data variability. Use of the modified paired t-test provides deflation detection that is more accurate and reliable than the previous ANOVA method which was already more accurate than calculations using the more common average value comparison methods.

The paired t-test is a statistical method applicable for use when data observation of two populations of interest is collected in pairs (i.e., data collected substantially simultaneously for the two wheels on a single axle). Each pair of observations is taken under substantially homogenous conditions, but these conditions may change from one pair of observations to the next. In the present invention, the paired t-test is run independently on pairs of wheel speed data taken from the front axle and pairs of wheel speed data taken from the rear axle. The paired t-test analyzes the differences between the paired data for each axle to provide independent to values for both axles. These to values are compared to predetermined upper and lower limits for each axle to determine whether the tires are properly inflated. The calculation of $t_0$ values according to the paired t-test is described in statistical texts. See for example, Hines and Montgomery, Probability and Statistics in Engineering and Management Science, pp. 312–313. The $t_0$ value is calculated as follows:

Let $(X_{11},X_{21}),(X_{12},X_{22}),\ldots,(X_{1n},X_{2n})$ be a set of n paired observations, where it is assumed that $X_1 \sim N(\mu_1,\sigma_1^2)$ and $X_2 \sim N(\mu_2, \sigma_2^2)$. Define the differences between each pair of observations as $D_j = X_{1j} - X_{2j}, j=1,2,\ldots,n$.

The $D_j$'s are nonnally distributed with mean $\mu_D = E(X_1 - X_2) = E(X_1) - E(X_2) = \mu_1 - \mu_2$ so testing hypotheses about equality of $\mu_1$ and $\mu_2$ can be accomplished by performing a one sample t-test on $\mu_D$.

Specifically, testing $H_0: \mu_1 = \mu_2$ against $H_1: \mu_1 \neq \mu_2$ is equivalent to testing $H_0: \mu_D = 0$ $H_1: \mu_D \neq 0$ The appropriate test statistic for the above equation is $$t_0 = \frac{\overline{D}}{S_D/\sqrt{n}}$$

where $$\overline{D} = \frac{\sum_{j=1}^{n} D_j}{n}$$

and $$S_D = \sqrt{\frac{\sum_{j=1}^{n} D_j^2 - \left[\left(\sum_{j=1}^{n} D_j\right)^2 / n\right]}{n-1}}$$

are the sample mean difference and standard deviation of the differences, respectively.

According to the preferred embodiment of the present invention, $t_0$ is calculated using a somewhat modified formulation of the $t_0$ equation. The modified $t_0$ equation is used to simplify the mathematics, making the calculations faster in a simple microcontroller where multiplication and division functions require more time than simple logic or addition operations, and where advanced math functions, such as the calculation of square roots, are not possible. The modified to equation uses an estimated standard deviation value $S_D$ described in statistical texts. See for example, Hines and Montgomery, Probability and Statistics in Engineering and Management Science, p. 584. The estimated standard deviation value is calculated as follows:

The relationship between the range, R, of k samples from a normal population with known parameters and the standard deviation of that population is needed. Since R is a random variable, the quantity $W=R/S_D$, called the relative range, is also a random variable. The parameters of the distribution of W have been determined for any sample size $n_R$ (designated as n in the statistical text, but designated herein as $n_R$ to eliminate confusion). The mean distribution of W is called $d_2$, and is tabulated for various $n_R$ in the above-mentioned statistical text.

Let $R_i$ be the range of the ith sample, and let $$\overline{R} = \frac{1}{k}\sum_{i=1}^{k} R_i$$

be the average range.
Then an estimate of $S_D$ would be $$S_D = \frac{\overline{R}}{d_2}.$$

This estimate works well for two reasons. First, the data range R is small because the data has been screened against abrupt changes caused by vehicle maneuvering. Additionally, the number of data samples k gathered by the wheel speed sensors is very high.

The modified paired t-test of the preferred invention also utilizes an interpolating look-up table to supply the value $\sqrt{n}$. Since simple microprocessors cannot compute this value directly, yet the range of inputs and outputs is clearly defined, accuracy is maintained and the calculation is simplified by interpolating the $\sqrt{n}$ using the following table:

| n | square root |
| --- | --- |
| 2500 | 50 |
| 3600 | 60 |
| 6400 | 80 |
| 10000 | 100 |
| 19600 | 140 |

By using an estimated standard deviation value and an interpolated $\sqrt{n}$ value to calculate to, the modified paired t-test provides an algorithm that can be utilized with a relatively inexpensive embedded integer processor or microcontroller, as opposed to the more expensive and slower floating-point processors required in many other prior art deflation detection methods using complex algorithms. Since the modified paired t-test algorithm does not require calculation of any square roots or multiplications to a power higher than two, an integer processor is more than suitable to perform the required calculations. It should be noted, however, that the present invention can be practiced using a floating point processor and the standard paired t-test as opposed to the faster, simpler and less expensive method used in the preferred embodiment.

To calculate the to value, the normalized percentage difference in wheel speed between the two wheels on the respective front and rear axles is used. The normalized percentage difference in wheel speed for the respective axles can be written as:

$$NORM_1 = \frac{(V_1 - V_2)}{V_{ref}}$$

$$NORM_2 = \frac{(V_3 - V_4)}{V_{ref}}$$

where $V_{ref}$ represents the velocity of the vehicle.

Theoretically, the percentage difference in wheel speed between two wheels on any one axle should be zero if the tires are equally inflated and the vehicle is travelling in a straight line on a level surface over a period of time. Due to built-in variations, however, it cannot be assumed that the rolling radii of different tires are exactly the same, nor can it be assumed that the rolling radius of each tire is constant over time.

In order to correct for these disparities, a correction factor $MOD_j$ is determined by taking the mean of the $NORM_j$ values during a calibration mode. As used herein and in the figures and appended claims, the use of the subscript "j" to modify a variable means that the variable is measured or calculated for both axles individually. $MOD_j$ simply represents the normally existing percent difference attributable to inherent disparities between the two tires on an axle. To correct the respective $NORM_j$ values for use during tire inflation monitoring, the following equations are used:

$$NORM_{i1} = \frac{(V_{i1} - V_{i2})}{V_{iref}} - MOD_1$$

and $$NORM_{i2} = \frac{(V_{i3} - V_{i4})}{V_{iref}} - MOD_2$$

As used herein and in the appended claims, the use of the subscript "i" to modify a variable means that the variable is measured or calculated repeatedly for each data set collected in the sample n. Note that the correction of percentage difference values does not affect the result of the paired t-test, nor the $t_0$ value.

To further distinguish the wheel speed difference caused by pressure loss from differences caused by other sources, a dynamic filtering process is used to exclude wheel speed data collected during various vehicle maneuvers. For that purpose, the algorithm according to the invention includes (1) wheel acceleration and deceleration filtering, (2) turning fluctuation filtering, and (3) rough road filtering at the ABS sampling period level. Additionally, a cornering detection routine is effective over a certain number of sampling periods, for example ten. For cornering, the difference between the linear speeds at the center of the right and left side wheels is proportional to vehicle speed and inversely proportional to cornering radius:

$$V_1 - V_2 = V_{ref} \frac{l}{r}$$

where r is the cornering radius and l is the track width. Wheel speed differences under this driving condition cannot be used to identify pressure loss due to the corruption by cornering. The algorithm identifies cornering by recognizing similar wheel speed difference patterns at both the front and the rear axles, and excludes the data collected under these conditions from entering the detection process. The equation can be simplified and manipulated as follows:

$$\frac{(V_1 - V_2)}{V_{ref}} = \frac{l}{r}$$

The left side of this equation is simply $NORM_j$ such that $$NORM_j = \frac{l}{r}$$

and $$\frac{1}{r} = \frac{NORM_j}{l}$$

1/r is recognized as the curvature and can be compared to predetermined curvature values "B" and "C" that represent the values of curvature beyond which the vehicle is judged to be in a significant curve. The "B" and "C" values are chosen to be small enough that the algorithm can detect a vehicle negotiating an actual turn (so that data during such situations can be ignored). On the other hand, a value that is too small will determine that the vehicle is negotiating a turn when in fact the driver is simply making normal course corrections while driving straight (thus reducing the amount of "good" data that is usable for deflation detection).

Other features and advantages of the invention will become apparent to those skilled in the art upon review of the following detailed description, claims, and drawings.

BRIEF DESCRIPTION OF THE DRAWINGS

FIG. 2 shows a more detailed flow chart of the calculation of to.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1A:
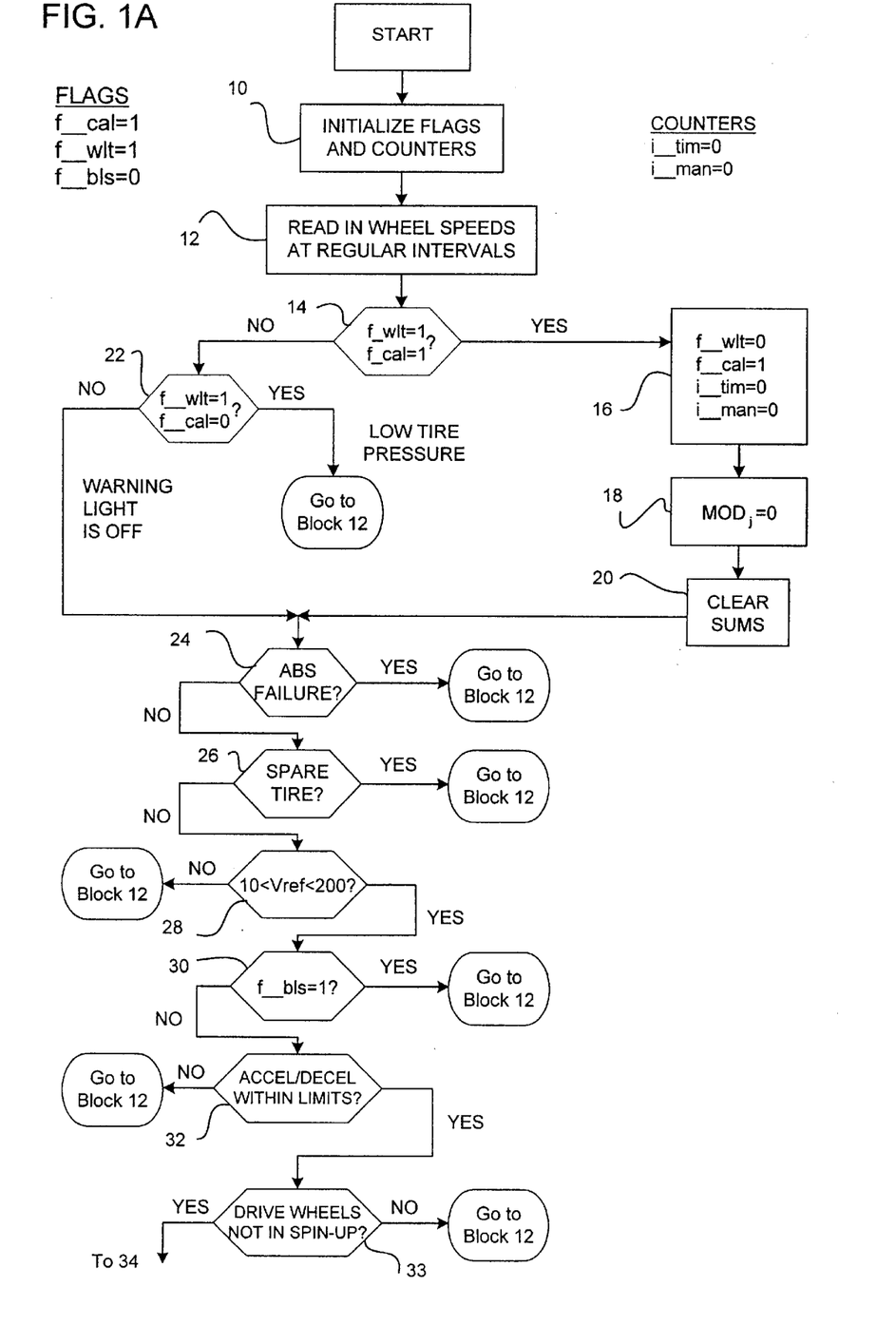
FIGS. 1A and 1B represent a flow chart of a preferred method according to the invention.
Figure 1B:
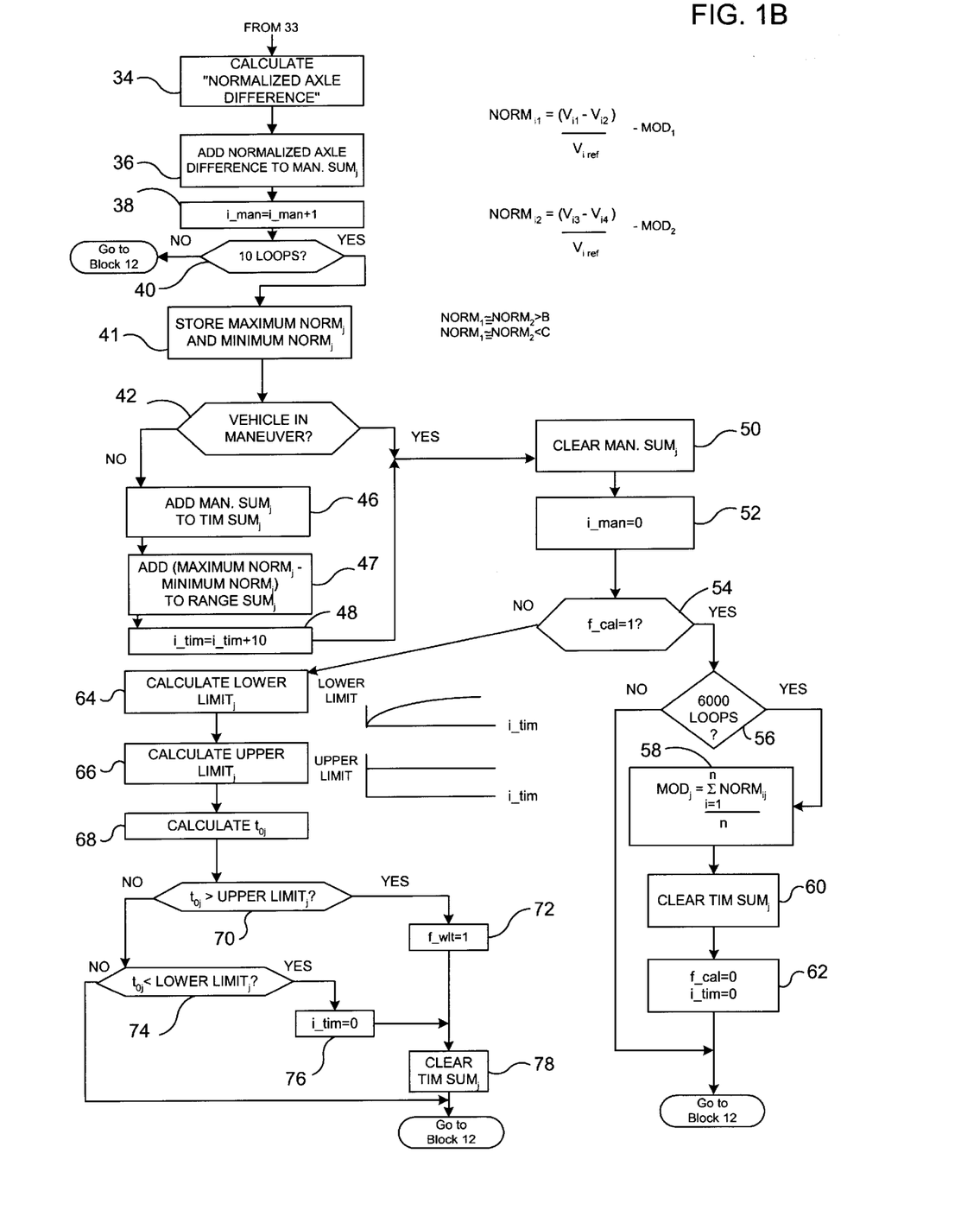
Figure 2:
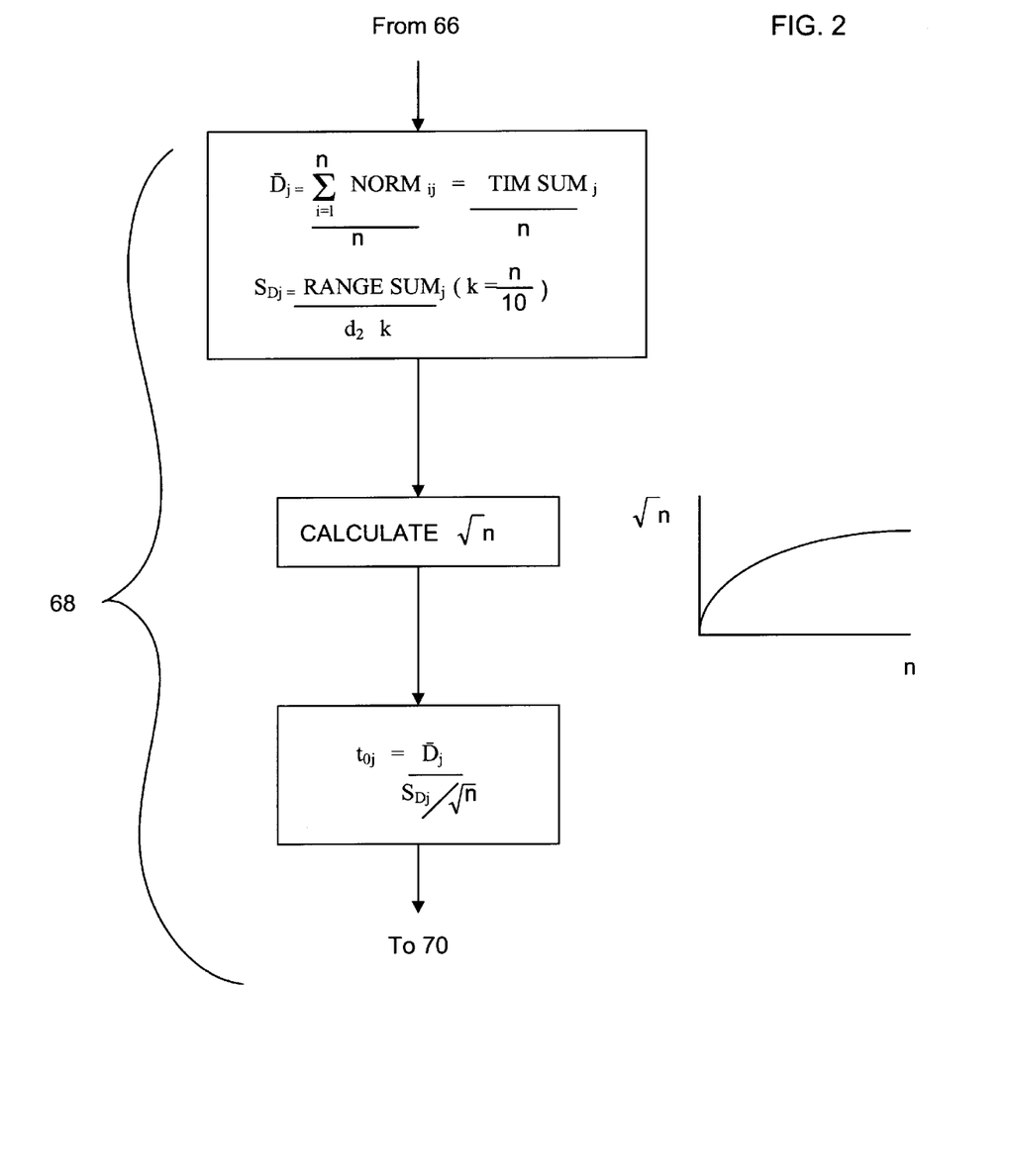

The flow chart represented in FIGS. 1A, 1B and 2 outlines a simplified rendition of a computer program that can be used to practice the method according to the present invention. Throughout the program, wheel speeds are read in from the wheel speed sensors at each of the four wheels at regular sampling intervals. These wheel speed values, which are used to calculate normalized percentage difference in wheel speed as described above, are used both in a calibration procedure, wherein built-in variations are determined, and the ensuing $t_0$ calculations, wherein inflation is checked. When deflation is detected, it is assumed that the driver will take remedial action to render the tire pressures uniform. On doing this, he can reset the system by pushing a reset button. This can be done any time re-calibration is desired, such as after a wheel alignment or fitting new tires.

Whenever the system is reset, the various flags and counters used in the program are initialized (block 10). Setting the calibration flag (f_cal=1) indicates that the reset button has been pushed and the calibration is to proceed. Setting the warning light flag (f_wlt=1) turns on the warning light setting. The brake light switch flag (f_bls=0) indicates lack of brake pressure. This switch is wired in parallel with the brake lights. The tire inflation monitoring counter (hereinafter TIM counter), which counts the total number n of data pairs used for either calibration or monitoring tire inflation, is set to zero (i_tim=0). Likewise, the maneuver counter, which is a loop counter operating in conjunction with the TIM counter, is set to zero (i_man=0).

Following initialization, reading of wheel speeds $V_1$, $V_2$, $V_3$ and $V_4$, begins (block 12). As each set of four values is read, the calibration and warning light flags are checked (block 14). If both are set, this is clear indication that the program is starting the calibration loop. The warning light is turned off (block 16), the modification factors $MOD_j$ are set at 0 (block 18) and the maneuver and TIM sums are cleared (block 20). If the warning light flag is set and the system is not in calibration (block 22), this is a clear indication that low tire pressure has been detected. The program returns to block 12 and continues to read in wheel speeds until the system is reset. It is now up to the driver to put air in the tires and reset the system.

If the warning light is off (answer "no" in block 22, or as a result of the warning light being cleared in block 16), then the wheel speed values are run through several filtering steps to eliminate values which cannot be used for a reliable calibration or tire inflation check. Block 24 checks for ABS failure, which is determined externally by the ABS control module so that the ABS shuts down, and automatic regulation of brake pressure is eliminated. Block 26 checks for presence of a spare tire, which is detected when one wheel speed is significantly faster than other wheel speeds. If either of the above checks is positive, the tire inflation monitoring step is bypassed and the program returns to block 12 for the next set of wheel speed data.

If the above checks are negative, filtering continues. Block 28 filters out wheel speeds which occur when the vehicle is moving especially slow (below 10 kph) or especially fast (above 200 kph). Block 30 checks for braking, and disregards values when the brake light switch is on. If braking is not present, the wheel speed values are checked for abrupt positive or negative changes (block 32), which would indicate non-steady behavior or wheel noise that can be caused, for example, by large bumps in the road. Block 32 only accepts wheel speed values when dv/dt is within limits which correspond to limits of wheel acceleration and deceleration. Block 33 checks for wheel spin-up which is an extreme form of acceleration in the drive wheels that may occur, for example, when a driver uses excessive throttle input on a slippery surface (e.g., ice or snow-covered roads). Wheel spin-up may be detected in block 32, but due to the large potential for "bad" data caused by spin-up, a second check is run in block 33. A comparison is made between each of the driven wheels and each of the undriven wheels. If the difference between any drive wheel and any undriven wheel is greater than "X", the data is not allowed to pass. "X" is a value larger than any observed drive slip, but is small enough to detect spin-up as quickly as possible.

Referring now to FIG. 1B, following the preliminary filtering of FIG. 1A, the normalized percentage difference in wheel speed between the left and right wheel of each axle is calculated in block 34 and is represented as $NORM_{j1}$ for the front axle and $NORM_{j2}$ for the rear axle. Note that if the calibration loop has not yet been completed, the modification factor for each axle $MOD_j$ is still set at 0. Following correction, the normalized axle percentage differences are added to the respective maneuver sums MAN $SUM_j$ (block 36) and the maneuver counter is incremented (block 38). The maneuver loop is a ten-loop cycle which is run at all times to check if the vehicle is in a maneuver. When ten loops are completed (block 40), MAN $SUM_j$ equals the sum of ten $NORM_j$ values. MAXIMUM $NORM_j$ represents the largest of these ten $NORM_j$ values and MINIMUM $NORM_j$ represents the smallest of these ten $NORM_j$ values. The MAXIMUM $NORM_j$ and MINIMUM $NORM_j$ values are stored in block 41.

A maneuver check is performed (block 42), wherein the ten $NORM_j$ values are compared with fixed values "B" and "C" to determine whether the vehicle is cornering. If the $NORM_j$ values fall outside the predetermined range between "B" and "C", the vehicle is in a turn and the program proceeds to block 50, which is described below. If the $NORM_j$ values fall within the predetermined range between "B" and "C", the maneuver sums for each axle are added to the tire inflation monitoring sums TIM $SUM_j$ (block 46). Next, the RANGE $SUM_j$ is updated by adding the range from the most recent data (block 47). The RANGE $SUM_j$ value represents the value $\overline{R}$ used to calculate the estimated standard deviation (as described above) and the (MAXIMUM $NORM_j$–MINIMUM $NORM_j$) value represents $R_i$. With the RANGE $SUM_j$ value updated, the TIM counter is incremented by 10 (block 48), signifying that ten more data pairs have been entered. Following this incrementing of the TIM sum and TIM counter, the program proceeds to block 50.

At block 50, the MAN $SUM_j$ is cleared and at block 52, the maneuver counter is reset. Block 54 then checks whether calibration is still underway, i.e., whether the calibration flag is still set to f_cal=1. Calibration following a reset requires 6000 filtered wheel speed readings. Thus, if the calibration flag remains set at f_cal=1, block 56 asks whether 6000 loops have been completed (i_tim=6000). If no, the program returns to block 12 where additional wheel speeds are read in, and the sequence is repeated until 6000 data pairs have been entered. Once the 6000 loops for calibration are completed, the modification factors $MOD_j$, are calculated for each axle (block 58). $MOD_j$ is simply the mean $NORM_j$ values for each axle as seen from the calculation in block 58. Recall that n is simply the current value of the TIM counter, i_tim. The TIM sums are cleared in block 60 because data collected to this point has been for calibration, and tire inflation monitoring has not yet begun. Finally, the calibration flag is set to zero and the TIM counter is reset (block 62). The program then returns to block 12 where new wheel speed values are read in and the program proceeds as described above.

The next time the program reaches block 54, the calibration flag is set at f_cal=0 (this was done at block 62), indicating that calibration is complete and tire inflation monitoring is ready to begin. The program then proceeds to block 64. First, a lower limit is calculated, representing a $t_0$ value below which both tires on a single axle are considered normally inflated with certainty. Lower limits are calculated individually for both the front and rear axle, thereby isolating the axles from one another and eliminating problems normally associated with drive slip and different size wheels or tires. The lower limit is a function of i_tim (the total number n of data pairs entered) and can be interpolated from a stored look-up table or alternatively can be calculated as will be described below. Next, an upper limit is calculated, representing a $t_0$ value above which a tire on a single axle is determined to be deflated with certainty (block 66). Again, separate upper limits for the front and rear axle are calculated to isolate the axles. Like the lower limit, the upper limit is a function of i_tim and can be interpolated from a stored look-up table or alternatively can be calculated.

In the case of a look-up table, experimental values for the upper and lower limits can be determined by driving the vehicle with deflated tires of varying degree. Corresponding to values can be determined, tabulated and stored in the microprocessor. The designer can choose the upper and lower limits for each axle in accordance with the desired sensitivity of deflation detection. Alternatively, if the exact change in rolling radius due to tire deflation is known (either by design or experimental means), the corresponding value of $\overline{D}_j$ can be calculated. $S_D$ can then be determined experimentally based on vehicle testing (to find standard deviation or "noise" caused by factors such as suspension tuning, tire stiffness, and choice of wheel speed sensors) and upper and lower limits for $t_0$ values can be calculated and stored in the microprocessor.

The actual $t_0$ value for each axle is now calculated (block 68, which is detailed in FIG. 2) according to the modified paired t-test described in the summary, i.e., by the calculation:

$$t_0 = \frac{\overline{D}_j}{S_D/\sqrt{n}}$$

where $$\overline{D}_j = \frac{\sum_{i=1}^{n} NORM_{ij}}{n} = \frac{TIM\ SUM_j}{n},$$

$$S_D = \frac{RANGE\ SUM_j}{d_2 k}$$

wherein $d_2$ is a constant (supplied from a statistical table, in this case $d_2=3.078$ since $n_R=10$) and $$k = \frac{n}{10},$$

and $\sqrt{n}$ is interpolated from a table stored in the microprocessor. Recall that n is simply the current value of the TIM counter, i_tim, at the point that to is being calculated.

Implementation of the to calculation may be simplified even more. For example, FIG. 2 shows that $D_j$ and $S_D$ both contain "n" in the denominator. Thus $t_0$ can be represented as $$t_0 = \frac{\sum_{i=1}^{n} NORM_{ij}}{RANGE\ SUM_j}\sqrt{n} \times c,$$

where "c" equals "$d_2/10$." Furthermore, "c" need not be used at all since this is a constant gain and may be simply incorporated (pre-processed) into the upper and lower limit in blocks 64 and 66, resulting in an even simpler calculation.

The to value for each axle is then compared to the upper limit (block 70, shown in FIG. 1B). If at block 70, the to value for an axle is greater than the upper limit, then a tire on that axle is determined to be deflated with certainty, in which case, a warning light is activated (block 72). The TIM sums are cleared (block 78) and the program returns to block 12. Wheel speed values will continue to be read in, but will not be used in this sub-routine. If the $t_0$ value for an axle is less than or equal to the upper limit, then the $t_0$ value is compared to the lower limit (block 74). If $t_0$ for an axle is less than the lower limit, then the tires on that axle are determined to be normally inflated with certainty. The TIM counter is cleared (block 76) and the TIM sums are cleared (block 78). Note that if $t_0$ is greater than the lower limit and less than the upper limit (a NO answer at block 74), the program returns to block 12 and data continues to be accumulated (resulting in more data pairs, n) until either the upper threshold or the lower threshold is crossed, respectively indicating either deflation with certainty or proper inflation with certainty.

While not shown in the figures, the program could include an option wherein the tire inflation monitoring subroutine continues after the warning light is activated in block 72. If $t_0$ later returns to a value less than the lower limit, the deflated tire has been properly serviced by the user and assumes its proper inflation level. When the $t_0$ value becomes less than the lower limit, the low tire pressure warning light is cleared (f_wlt=0) automatically and the driver need not manually reset the system.

Various features of the invention are set forth in the following claims.

What is claimed is:

1. A method for detecting loss of pressure in a tire of a motor vehicle having four wheels and a tire on each wheel, the method comprising:

measuring the wheel speed of a first wheel on an axle a plurality of times n;

measuring the wheel speed of a second wheel on the axle a plurality of times n; and using the measured wheel speeds in a paired t-test statistical analysis to determine whether either wheel has a deflated tire.

2. The method of claim 1, wherein the paired t-test statistical analysis utilizes the equation $$t_0 = \frac{\overline{D}}{S_D/\sqrt{n}},$$

wherein $\overline{D}$ is the sample mean difference of the wheel speeds for the first and second wheels, $S_D$ is the standard deviation of the wheel speed differences for the first and second wheels, and $t_0$ is the $t_0$ value of the paired t-test.

3. The method of claim 2, wherein $\overline{D}$ is calculated by calculating a percentage difference between the first and second wheel speeds for each time set n, adding the percentage difference values to form a tire inflation monitoring sum TIM SUM, and calculating $\overline{D}$ according to $$\overline{D} = \frac{TIM\ SUM}{n}.$$

4. The method of claim 2, wherein $S_D$ is calculated according to $$S_D = \sqrt{\frac{\sum_{j=1}^{n} D_j^2 - \left[\left(\sum_{j=1}^{n} D_j\right)^2 / n\right]}{n-1}},$$

wherein $D_j$ is the difference between the wheel speeds for the first and second wheels.

5. The method of claim 4, wherein $S_D$ is calculated using a floating point microprocessor.

6. The method of claim 2, wherein $S_D$ is calculated according to $$S_D = \frac{RANGE\ SUM}{d_2 k},$$

wherein $$k = \frac{n}{10},$$

$d_2$ is the mean of the relative range distribution and is a constant supplied from a statistics table, and RANGE SUM is the range of normalized percentage difference values between wheel speeds for the first and second wheels.

7. The method of claim 6, wherein the microprocessor is an integer microprocessor.

8. The method of claim 2, wherein $\sqrt{n}$ is supplied from a table stored in a microprocessor.

9. The method of claim 8, wherein the microprocessor is an integer microprocessor.

10. The method of claim 2, wherein the $t_0$ value is compared to a predetermined upper limit to determine whether either tire is deflated.

11. The method of claim 10, further including actuating a driver warning device when $t_0$ exceeds the upper limit.

12. The method of claim 2, wherein the $t_0$ value is compared to a predetermined lower limit to determine whether either tire is properly inflated.

13. The method of claim 1, wherein the axle is a first axle and the method further comprises:
   measuring the wheel speed of a first wheel on a second axle a plurality of times n;
   measuring the wheel speed of a second wheel on the second axle a plurality of times n; and
   using the measured wheel speeds from the second axle in the paired t-test statistical analysis to determine whether either wheel on the second axle has a deflated tire.

14. The method of claim 13, wherein the paired t-test statistical analysis isolates the axles by using the measured wheel speeds from the first axle independently of the measured wheel speeds from the second axle.

15. A method for detecting loss of pressure in a tire of a motor vehicle having four wheels and a tire on each wheel, the method comprising:

measuring the wheel speeds $V_{i1}$, $V_{i2}$, $Y_{i3}$ and $V_{i4}$ a plurality of times n;

calculating the normalized percentage difference values $NORM_{i1}$ between the wheel speeds $V_{i1}$ and $V_{i2}$ on a first axle, where $$NORM_{i1} = \frac{(V_{i1} - V_{i2})}{V_{iref}}$$

calculating the normalized percentage difference values $NORM_{i2}$ between the wheel speeds $V_{i3}$ and $V_{i4}$ on a second axle, where $$NORM_{i2} = \frac{(V_{i3} - V_{i4})}{V_{iref}}$$

adding the $NORM_{i1}$ values to form a tire inflation monitoring sum TIM $SUM_1$;

adding the $NORM_{i2}$ values to form a tire inflation monitoring sum TIM $SUM_2$;

calculating a first sample mean difference value $\overline{D}_1$ where $$\overline{D}_1 = \frac{TIM\ SUM_1}{n}$$

calculating a second sample mean difference value $\overline{D}_2$ where $$\overline{D}_2 = \frac{TIM\ SUM_2}{n}$$

calculating a first standard deviation value $S_{D1}$ where $$S_{D1} = \frac{RANGE\ SUM_1}{d_2 k}$$

wherein $$k = \frac{n}{10},$$

$d_2$ is the mean of the relative range distribution and is a constant supplied from a statistics table, and RANGE $SUM_1$ is the range of $NORM_{i1}$ values;

calculating a second standard deviation value $S_{D2}$ where $$S_{D2} = \frac{RANGE\ SUM_2}{d_2 k}$$

wherein $$k = \frac{n}{10},$$

$d_2$ is the mean of the relative range distribution and is a constant supplied from a statistics table, and RANGE $SUM_2$ is the range of $NORM_{i2}$ values;

calculating a first $t_0$ value $t_{01}$ for the first axle where $$t_{01} = \frac{\overline{D}_1}{S_{D1}/\sqrt{n}}$$

wherein $\sqrt{n}$ is supplied from a second table in the microprocessor;

calculating a second $t_0$ value $t_{02}$ for the second axle where $$t_{02} = \frac{\overline{D}_2}{S_{D2}/\sqrt{n}}$$

wherein $\sqrt{n}$ is supplied from the second table in the microprocessor;

comparing $t_{01}$ to a predetermined upper limit to determine whether the first axle has a deflated tire thereon; and comparing $t_{02}$ to a predetermined upper limit to determine whether the second axle has a deflated tire thereon.

16. The method of claim 15, further comprising actuating a driver warning device when $t_{01}$ or $t_{02}$ exceeds the respective predetermined upper limits.

17. The method of claim 15, further comprising comparing $t_{01}$ to a predetermined lower limit to determine whether the tires on the first axle are properly inflated; and comparing $t_{02}$ to a predetermined lower limit to determine whether the tires on the second axle are properly inflated.

18. The method of claim 15 further comprising measuring the wheel speeds $V_{i1}$, $V_{i2}$, $V_{i3}$ and $V_{i4}$ a plurality of times m in a calibration time interval prior to the plurality of times n;

determining the first axle calibration factor $MOD_1$, the axle calibration factor MOD, discounting variations in rolling radii between the two wheels on the first axle;

modifying the normalized percentage difference $NORM_{i1}$ by $MOD_1$ during the plurality of times n;

determining the second axle calibration factor $MOD_2$, the axle calibration factor $MOD_2$ discounting variations in rolling radii between the two wheels on the second axle; and modifying the normalized percentage difference $NORM_{i2}$ by $MOD_2$ during the plurality of times n.

19. The method of claim 15 further comprising determining when the vehicle is cornering and excluding wheel speeds measured during cornering from the steps used to calculate the respective $t_{01}$ and $t_{02}$ values.

20. The method of claim 15 further comprising determining when the vehicle is accelerating or decelerating within predetermined limits and excluding wheel speeds measured during acceleration or deceleration outside the predetermined limits from the steps used to calculate the respective $t_{01}$ and $t_{02}$ values.

* * * * *

UNITED STATES PATENT AND TRADEMARK OFFICE
CERTIFICATE OF CORRECTION

PATENT NO. : 6,222,444 B1 Page 1 of 1
DATED : April 24, 2001
INVENTOR(S) : Orson Szu-Han Wang It is certified that error appears in the above-identified patent and that said Letters Patent is hereby corrected as shown below:

Column 3,
Line 28, delete both instances of "to" and insert -- $t_o$ --.

Column 4,
Line 18, delete "to" and insert -- $t_o$ -- and last line, delete the second occurrence of "to" and insert -- $t_o$ --.

Column 5,
Line 14, delete the second occurrence of "to" and insert -- $t_o$ --.

Column 6,
Line 54, delete "to" and insert -- $t_o$ --.

Column 9,
Line 28, delete "to" and insert -- $t_o$ -- and last line delete "to" and insert -- $t_o$ --.

Column 10,
Line 1, delete "to" and insert -- $t_o$ -- and
Line 15, delete the first occurrence of "to" and insert -- $t_o$ -- and
Line 16, delete "to" and insert -- $t_o$ --.

Column 12,
Line 1, delete "$Y_{i3}$" and insert -- $V_{i3}$ --.

Column 14,
Line 6, delete "MOD," and insert -- $MOD_1$ --.

Signed and Sealed this

Fifteenth Day of April, 2003

JAMES E. ROGAN
*Director of the United States Patent and Trademark Office*